United States Patent
Groeschel

(10) Patent No.: US 10,330,107 B2
(45) Date of Patent: Jun. 25, 2019

(54) DRIVE ROTOR FOR A MAGNETICALLY COUPLED PUMP HAVING TOLERANCE RINGS

(71) Applicant: KSB Aktiengesellschaft, Frankenthal (DE)

(72) Inventor: Juergen Groeschel, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 174 days.

(21) Appl. No.: 14/889,763

(22) PCT Filed: Apr. 29, 2014

(86) PCT No.: PCT/EP2014/058680
§ 371 (c)(1),
(2) Date: Nov. 6, 2015

(87) PCT Pub. No.: WO2014/180708
PCT Pub. Date: Nov. 13, 2014

(65) Prior Publication Data
US 2016/0115961 A1    Apr. 28, 2016

(30) Foreign Application Priority Data

May 8, 2013   (DE) .................. 10 2013 208 476

(51) Int. Cl.
*F04D 25/06*   (2006.01)
*F04D 29/42*   (2006.01)
(Continued)

(52) U.S. Cl.
CPC ......... *F04D 29/043* (2013.01); *F04D 13/024* (2013.01); *F04D 13/0613* (2013.01);
(Continued)

(58) Field of Classification Search
CPC .... F04D 13/0626; F04D 29/22; F04D 29/053; F04D 29/043; F04D 29/28; F04D 29/04;
(Continued)

(56) References Cited

U.S. PATENT DOCUMENTS 4,222,246 A * 9/1980 Rongley ............... F16D 1/0835
                                                             464/30
4,479,735 A * 10/1984 Thompson ............ F16D 1/0835
                                                             403/28
(Continued)

FOREIGN PATENT DOCUMENTS

DE       20 23 834       11/1971
DE    84 36 638.9 U1     2/1985
(Continued)

OTHER PUBLICATIONS

TranslateJP2004218572, machine translation of JP 2004-218572, Espacenet.com, Jul. 21, 2017, pp. 1-3.*
(Continued)

*Primary Examiner* — Bryan M Lettman
*Assistant Examiner* — Timothy P Solak
(74) *Attorney, Agent, or Firm* — Crowell & Moring LLP

(57) ABSTRACT

A magnetic clutch pump arrangement is provided. The pump arrangement includes a pump housing containing an impeller shaft, a containment shell sealing an enclosed chamber within the housing, an impeller mounted on the impeller shaft, an inner rotor mounted on the other end of the impeller shaft, a drive motor, a drive shaft drivable by the drive motor, and an outer rotor outside of the enclosed chamber, mounted on the drive shaft, which magnetically interacts with the inner rotor. The external rotor has a hub with a through-bore having an interior surface which includes an axial groove extending parallel to the axis of rotation which cooperates with a feather key and a drive shaft key groove (Continued)

to rotationally secure the hub to the drive shaft. At least one radially circumferential first groove and at least one radially circumferential second groove in the hub interior surface receive tolerance rings.

7 Claims, 5 Drawing Sheets

(51) Int. Cl.
    *F04D 29/043*     (2006.01)
    *F16D 1/08*     (2006.01)
    *F04D 13/02*     (2006.01)
    *F04D 13/06*     (2006.01)
    *F16D 3/77*     (2006.01)
    *F04D 29/60*     (2006.01)
    *F04D 29/044*     (2006.01)

(52) U.S. Cl.
    CPC ......... *F04D 13/0626* (2013.01); *F04D 25/06* (2013.01); *F04D 29/426* (2013.01); *F16D 1/0835* (2013.01); *F04D 29/044* (2013.01); *F04D 29/605* (2013.01); *F16D 1/0876* (2013.01); *F16D 3/77* (2013.01)

(58) Field of Classification Search
    CPC .... F04D 29/0405; F04D 29/44; F04D 29/054; F04D 13/024; F04D 13/0613; F16D 1/0835; F16D 3/77; F16D 1/0876; F16H 57/0025
    See application file for complete search history.

(56) References Cited

U.S. PATENT DOCUMENTS

| | | | | |
|---|---|---|---|---|
| 4,500,260 | A * | 2/1985 | Mayer | F02B 33/42 417/64 |
| 5,580,216 | A * | 12/1996 | Munsch | F04D 29/0413 415/122.1 |
| 7,137,793 | B2 * | 11/2006 | Shafer | F04C 2/101 417/420 |
| 2008/0213087 | A1 | 9/2008 | Wagner | |
| 2009/0062020 | A1 * | 3/2009 | Edwards | F04D 13/021 464/89 |
| 2010/0003076 | A1 * | 1/2010 | Slayne | F16D 1/0835 403/365 |
| 2010/0158679 | A1 | 6/2010 | Aust et al. | |
| 2011/0076096 | A1 * | 3/2011 | Slayne | F16C 27/02 403/372 |

FOREIGN PATENT DOCUMENTS

| | | | | |
|---|---|---|---|---|
| DE | 90 00 501.5 | U1 | 4/1990 | |
| DE | 195 41 247 | A1 | 5/1997 | |
| DE | 297 16 110 | U1 | 1/1999 | |
| DE | 20 2004 013 080 | U1 | 1/2006 | |
| DE | 195 13 962 | B4 | 6/2007 | |
| DE | 10 2004 058 533 | B4 | 4/2011 | |
| EP | 1 746 290 | A1 | 1/2007 | |
| JP | 50-117254 | U | 9/1975 | |
| JP | 55-64523 | U | 5/1980 | |
| JP | 57-167289 | U | 10/1982 | |
| JP | 60-170090 | U | 11/1985 | |
| JP | 61-82128 | U | 5/1986 | |
| JP | 2004 218572 | | * 8/2004 | ............ F04D 29/22 |
| JP | 2005-127139 | A | 5/2005 | |
| JP | 2009-57967 | A | 3/2009 | |
| WO | WO 2005/017362 | A1 | 2/2005 | |
| WO | WO 2011/154783 | A2 | 12/2011 | |

OTHER PUBLICATIONS

International Search Report (PCT/ISA/210) issued in PCT Application No. PCT/EP2014/058680 dated Aug. 12, 2014, with English translation (six (6) pages).
German Office Action issued in counterpart German Application No. 10 2013 208 476.5 dated Oct. 30, 2013 (five (5) pages).
German-language Written Opinion (PCT/ISA/237) issued in PCT Application No. PCT/EP2014/058680 dated Aug. 12, 2014 (six (6) pages).
International Preliminary Report on Patentability (PCT/IB/373) issued in PCTApplication No. PCT/EP2014/058680 dated Nov. 10, 2015, including English translation of document C3 (German-language Written Opinion (PCT/ISA/237)) previously filed on Nov. 6, 2015 (Nine (9) pages).
English translation of Japanese Office Action issued in counterpart Japanese Application No. 2016-512287 dated Feb. 27, 2018 (four pages).

* cited by examiner

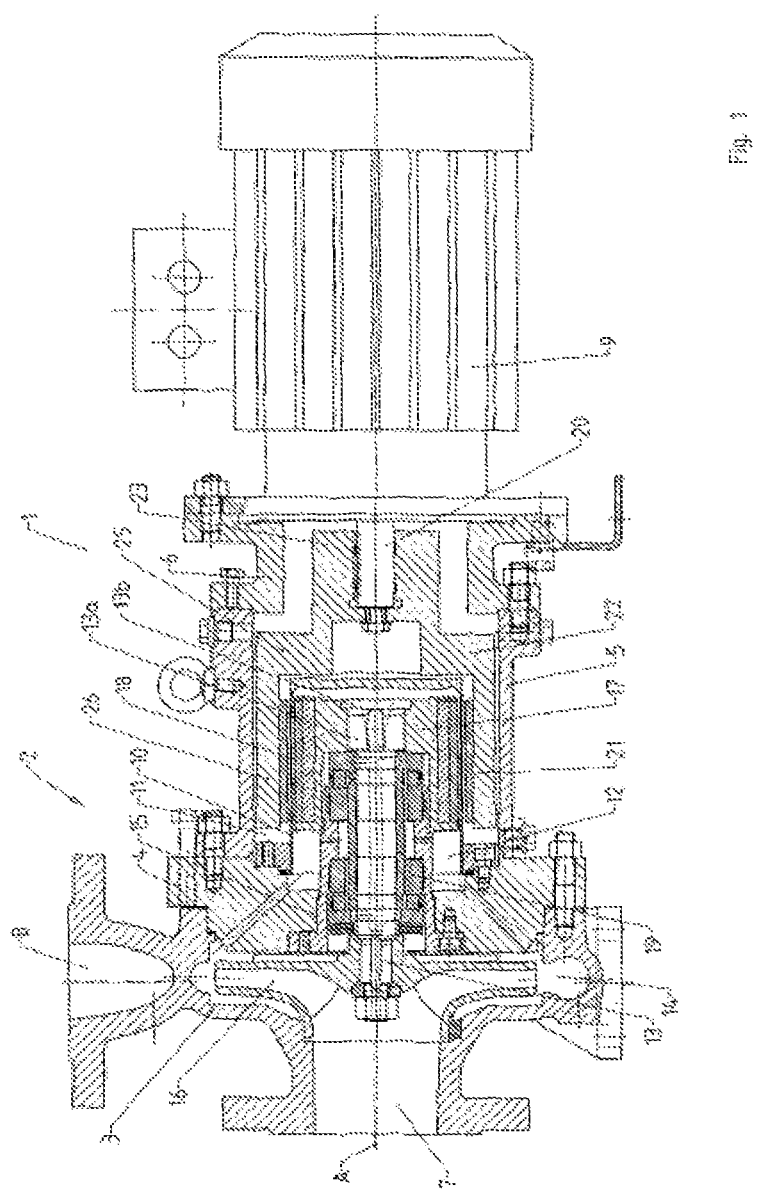

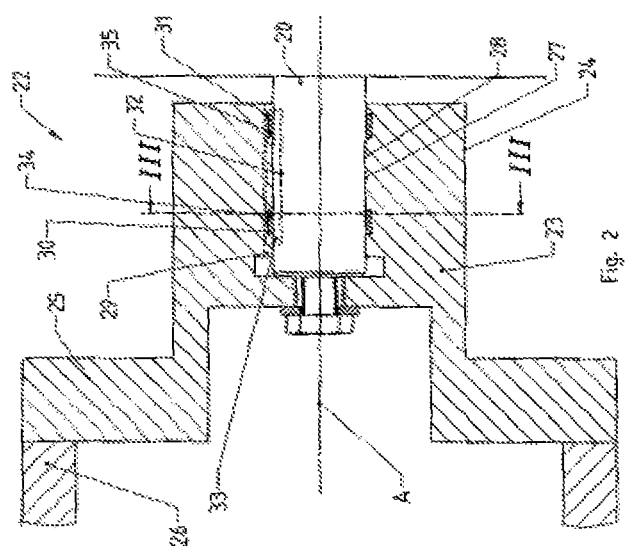

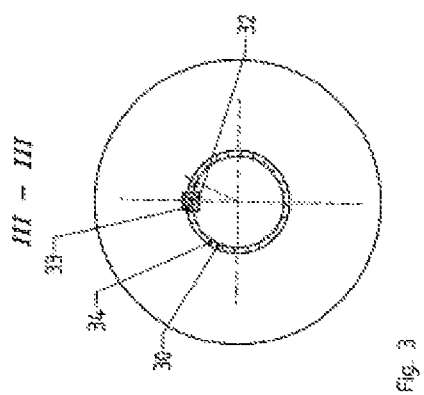

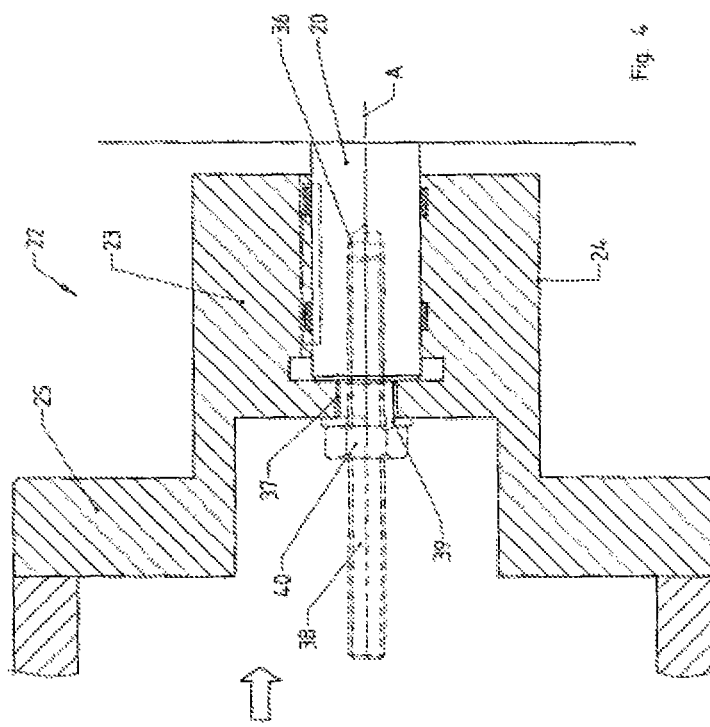

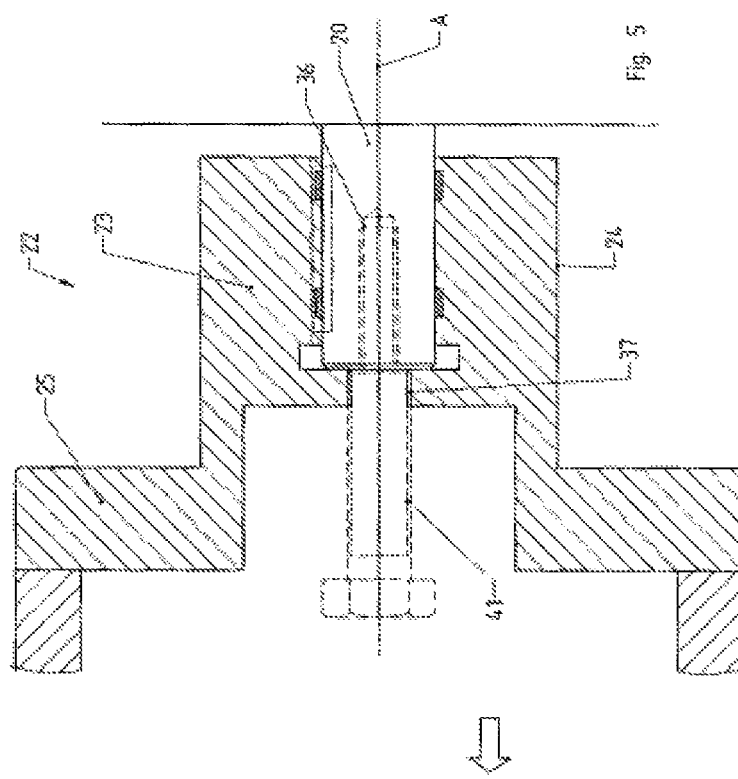

DRIVE ROTOR FOR A MAGNETICALLY COUPLED PUMP HAVING TOLERANCE RINGS

CROSS REFERENCE TO RELATED APPLICATIONS

This application is a continuation of PCT International Application No. PCT/EP2014/058680, filed Apr. 29, 2014, which claims priority under 35 U.S.C. § 119 from German Patent Application No. 10 2013 208 476.5, filed Aug. 5, 2013, the entire disclosures of which are herein expressly incorporated by reference.

BACKGROUND AND SUMMARY OF THE INVENTION

The invention relates to a pump arrangement, in particular magnetic clutch pump arrangement. The pump arrangement has an interior space formed by a pump casing of the pump arrangement, a containment can which hermetically seals off a chamber surrounded by said containment can with respect to the interior space formed by the pump casing, an impeller shaft which can be driven in rotation about an axis of rotation, an impeller which is arranged on one end of the impeller shaft, an inner rotor arranged on the other end of the impeller shaft, having a drive motor, having a drive shaft which can be driven rotatably about the axis of rotation by the drive motor, and an outer rotor which is arranged on the drive shaft and which interacts with the inner rotor. The outer rotor has a hub with a hub inner surface formed by a passage bore, in which hub inner surface there is formed an axial groove which extends parallel to the axis of rotation and which interacts with a feather key inserted into a feather key groove of the drive shaft.

German patent document no. DE 84 36 638 U1 has disclosed a pump arrangement of said type. Despite a tight sliding fit of the outer magnet carrier on the drive shaft, the fit clearance that still exists has the effect that the outer magnet carrier tilts relative to the drive shaft, whereby, as the drive shaft is driven in rotation, the outer magnet carrier exhibits a wobbling movement, which can lead to damage to the containment can or to other parts within the pump arrangement. If the fit is selected to be too tight, mounting is possible only with a heating action, and dismounting is possible only with the use of special tools.

It is the object of the invention to provide a pump arrangement which permits clearance-free mounting, which can be performed without the use of special tools, of the outer rotor, which bears the magnets, onto the drive shaft of a drive motor.

The object of the invention is achieved in that at least one radially encircling first groove and at least one radially encircling second groove are formed in the hub inner surface, wherein a tolerance ring is arranged at least in two of the grooves.

It is preferable for a tolerance ring to be arranged in at least one or more of the first grooves and in one or more of the second grooves.

It is expedient for a tolerance ring to be arranged in one of the first grooves and for a tolerance ring to be arranged in one of the second grooves.

In one refinement of the invention, it is proposed that the pump arrangement is of a block-type design, that is to say the pump casing is connected to the motor casing. In this way, no baseplate, or a baseplate of relatively small size, is required for the pump arrangement. Furthermore, a mechanical coupling can be dispensed with. Furthermore, expenditure of effort that is otherwise required for alignment purposes is omitted.

Adverse true running characteristics of the outer rotor which is driven rotatably by way of the drive shaft are avoided if at least one first groove is formed in a region of the hub inner surface which is situated substantially between the center of the hub and the first carrier element in the axial direction, and/or at least one second groove is formed in a region of the hub inner surface which extends substantially from the center of the hub to a point close to that end of the hub which is situated opposite the first carrier element.

What has proven to be particularly advantageous is a refinement in which the outer shell surface of the hub is of smooth form. By virtue of bores, discontinuities or slots in or on the outer shell surface of the hub being omitted, it is made possible for the outer rotor to be slid onto the drive shaft without damage being caused to seal elements arranged in said region.

For simple mounting and dismounting of the hub and drive shaft, there is provided a threaded bore which is formed in the outer rotor in the region of the first carrier element.

With regard to the simple mounting and dismounting of hub and drive shaft, it is provided here that the threaded bore has a larger diameter than a threaded blind bore provided in the drive shaft.

In a further advantageous refinement, the tolerance rings are dimensioned such that they do not extend into the feather key groove which receives the feather key.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 shows the longitudinal section through a magnetic clutch pump arrangement having a hub-shaft connection according to an embodiment of the invention, FIG. 2 shows a hub-shaft connection corresponding to FIG. 1 in an enlarged illustration, FIG. 3 shows a section along the line III-III from FIG. 2, FIG. 4 shows the mounting of the hub onto the shaft in accordance with an embodiment of the invention, and FIG. 5 shows the dismounting of the hub from the shaft in accordance with an embodiment of the invention.

DETAILED DESCRIPTION

FIG. 1 shows a pump arrangement 1 in the form of a magnetic clutch pump arrangement having a pump part and having an electrical part. The pump part of the pump arrangement 1 has a multi-part pump casing 2 of a centrifugal pump, which pump casing comprises a hydraulics casing 3 designed as a spiral casing, a casing cover 4, a bearing carrier cage 5 and a connecting element 6.

The hydraulics casing 3 has an inlet opening 7 for the intake of a delivery medium and has an outlet opening 8 for the discharge of the delivery medium. The casing cover 4 is arranged on that side of the hydraulics casing 3 which is situated opposite the inlet opening 7. The bearing carrier cage 5 is fastened to that side of the casing cover 4 which is opposite from the hydraulics casing 3. The connecting element 6 is mounted on that side of the bearing carrier cage 5 which is situated opposite the casing cover 4. On the connecting element 6, on the side situated opposite the bearing carrier cage 5, there is arranged a drive motor 9 which forms the electrical part. The pump arrangement 1 is of a block-type design, that is to say the pump casing 2 and the casing of the drive motor 9 are connected to one another, for example by way of the connecting element 6.

A containment can 10 is fastened to that side of the casing cover 4 which is opposite from the hydraulics casing 3, and said containment can extends at least partially through an interior space 11 delimited by the pump casing 2, in particular by the casing cover 4, by the bearing carrier cage 5 and by the connecting element 6. The containment can 10 hermetically seals off a chamber 12, which is enclosed by said containment can, with respect to the interior space 11.

An impeller shaft 13 which is rotatable about an axis of rotation A extends from a flow chamber 14, which is delimited by the hydraulics casing 3 and by the casing cover 4, into the chamber 12 through an opening 15 provided in the casing cover 4.

An impeller 16 is fastened to a shaft end, situated within the flow chamber 14, of the impeller shaft 13, and an inner rotor 17 arranged within the chamber 12 is arranged on the opposite shaft end, which has two shaft sections 13a, 13b with increasing diameters in each case. The inner rotor 17 is equipped with multiple magnets 18 which are arranged on that side of the inner rotor 17 which faces toward the containment can 10.

Between the impeller 16 and the inner rotor 17 there is arranged a bearing arrangement 19 which is operatively connected to the impeller shaft 13, which can be driven in rotation about the axis of rotation A.

The drive motor 9 drives a drive shaft 20. The drive shaft 20, which can be driven about the axis of rotation A, is arranged substantially coaxially with respect to the impeller shaft 13. The drive shaft 20 extends into the connecting element 6 and possibly at least partially into the bearing carrier cage 5. On the free end of the drive shaft 20 there is arranged an outer rotor 22, which bears multiple magnets 21. The magnets 21 are arranged on that side of the outer rotor 22 which faces toward the containment can 10. The outer rotor 22 extends at least partially over the containment can 10 and interacts with the inner rotor 17 such that the rotating outer rotor 22, by way of magnetic forces, sets the inner rotor 17 and thus likewise the impeller shaft 13 and the impeller 16 in rotation.

The outer rotor 22, which is illustrated on an enlarged scale in FIG. 2, comprises a hub 23 with a smooth outer shell surface 24, a flange-like first carrier element 25, which is formed or arranged on that side of the hub 23 which faces toward the containment can 10, and a hollow cylindrical second carrier element 26, which is formed or arranged on the first carrier element 25 and which at least partially surrounds the containment can 10 and on which the magnets 21 are arranged. The first and second carrier elements 25, 26 are illustrated as two parts that can be connected to one another, though may also be produced as one part.

A passage bore 27 extends through the hub 23 and forms a hub inner surface 28. In the hub inner surface 28 there is formed an axial groove 29 which extends parallel to the axis of rotation A. Furthermore, at least one radially encircling first groove 30 is formed on the hub inner surface 28 at the side situated close to the first carrier element 25, and at least one radially encircling second groove 31 is formed on the hub inner surface 28 at the side remote from the first carrier element 25. In the illustration shown, the first and second grooves 30, 31 are of the same dimensions. If required, the dimensions may be selected so as to differ. At least one first groove 30 is formed in a region of the hub inner surface 28 which is situated substantially between the center of the hub 23 and the first carrier element 25 in the axial direction. At least one second groove 31 is formed in a region of the hub inner surface 28 which extends substantially from the center of the hub 23 to a point close to that end of the hub 23 which is situated opposite the first carrier element 25. In the drive shaft 20 there is formed a feather key groove 32 which is oriented toward the axial groove 29 and into which a feather key 33 is inserted for the transmission of the motor torque to the hub 23 of the outer rotor 22. In FIG. 2, a tolerance ring 34 is situated in the first groove 30 and a tolerance ring 35 is situated in the second groove 31. If multiple first and second grooves 30, 31 are used, a tolerance ring 34, 35 is arranged in at least one or more of the first grooves 30 and in one or more of the second grooves 31. In particular, a tolerance ring 34 is arranged in precisely one of the first grooves 30, and a tolerance ring 35 is arranged in precisely one of the second grooves 31.

As can be seen from FIG. 3, the tolerance ring 34 arranged in the first groove 30 is dimensioned such that it does not extend into the feather key groove 32 which receives the feather key 33. This applies correspondingly to the tolerance ring 35 arranged in the second groove 31. Depending on the size of the feather key groove 32, the tolerance ring 34 spans an angle of approximately 300° to approximately 320°. The same applies to the tolerance ring 35. The tolerance rings 34, 35 are furthermore dimensioned such that tilting of the outer rotor 22 within the clearance fit that still exists between hub 23 and drive shaft 20 is prevented. The spring force of the tolerance rings 34, 35 corresponds at least to the weight force of the overhung outer rotor 22 plus a centrifugal force that arises from an imbalance of the outer rotor 22. The forces are composed of weight force and centrifugal force in the ratio of the spacing of the tolerance rings 34, 35 and the lever arms.

FIG. 4 shows a possible process of the mounting of the hub 23 onto the drive shaft 20. It can be seen that, on the free end of the drive shaft 20, a threaded blind bore 36 is provided concentrically with respect to the axis of rotation A. In the outer rotor 22, in the region of the first carrier element 25, there is provided a threaded bore 37, which is likewise formed concentrically with respect to the axis of rotation A. Here, the threaded bore 37 has a greater diameter than the threaded blind bore 36. For the mounting of the outer rotor 22 onto the drive shaft 20, a stud screw 38 is firstly screwed into the threaded blind bore 36. Subsequently, the hub 23 of the outer rotor 22 is placed onto the drive shaft 20, wherein the stud screw 38 extends through the threaded bore 37. A shim washer 39 is pushed over the stud screw 38 until it abuts against the outer rotor 22. By means of a threaded nut 40 screwed onto the stud screw 38, the hub 23 of the outer rotor 22 is pushed onto the drive shaft 20. Since bores, discontinuities or slots in or on the outer shell surface 24 of the hub 23 are dispensed with, the latter is of smooth form, that is to say of uniform or level form, and it is possible for the outer rotor 22 to be slid onto the drive shaft 20 without damage being caused to any seal elements, which are however not shown but which are for example shaft sealing rings, arranged in said region.

As can be seen from FIG. 5, to pull the outer rotor 22 off, a screw 41 is screwed into the threaded bore 37 until it abuts against the drive shaft 20. Screwing the screw 41 further into the threaded bore 37 causes the outer rotor 22, with its hub 23, to be pulled off the drive shaft 20.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

LIST OF REFERENCE DESIGNATIONS

1 Pump arrangement
2 Casing
3 Hydraulics casing
4 Casing cover
5 Bearing carrier cage
6 Connecting element
7 Inlet opening
8 Outlet opening
9 Drive motor
10 Containment can
11 Interior space
12 Chamber
13 Impeller shaft
13a Shaft section
13b Shaft section
14 Flow chamber
15 Opening
16 Impeller
17 Inner rotor
18 Magnet
19 Bearing arrangement
20 Drive shaft
21 Magnet
22 Outer rotor
23 Hub
24 Outer shell surface
25 First carrier element
26 Second carrier element
27 Passage bore
28 Hub inner surface
29 Axial groove
30 First groove
31 Second groove
32 Feather key groove
33 Feather key
34 Tolerance ring
35 Tolerance ring
36 Threaded blind bore
37 Threaded bore
38 Stud screw
39 Shim washer
40 Threaded nut
41 Screw
A Axis of rotation

The invention claimed is:

1. A pump arrangement, comprising:
a pump casing having an interior space;
a containment can having a central longitudinal axis and being arranged to hermetically seal a chamber in the interior space;
an impeller shaft;
an impeller arranged on an impeller end of the impeller shaft;
an inner rotor arranged within the containment can on an end of the impeller shaft opposite the impeller end of the impeller shaft; b1
an outer rotor arranged radially outside of the containment can and axially located to interact with the inner rotor,
a drive motor, and
a drive shaft arranged to be driven by the drive motor and to be coupled to the outer rotor,
wherein
the outer rotor has a hub having a passage bore formed along the central longitudinal axis,
the passage bore has a hub inner surface having
an axial groove which extends parallel to the central longitudinal axis, the axial groove being configured to interact with a feather key engaged in a corresponding feather key groove of the drive shaft to rotationally fix the outer rotor with the drive shaft,
at least one radially encircling first groove and at least one radially encircling second groove,
tolerance rings are arranged in at least one of the at least one radially encircling first grooves and in the at least one radially encircling second grooves,
the tolerance rings are configured to prevent radial movement of the outer rotor and the drive shaft relative to one another by elastic deformation,
when in an installed position the tolerance rings are configured to generate a spring force between the drive shaft and the outer rotor that corresponds to a weight force from the weight of the outer rotor and a centrifugal force generated by an amount of imbalance of the outer rotor, without rotationally fixing the outer rotor to the b2 drive shaft, at least one first groove of the at least one radially encircling first grooves is formed in a first region of the hub inner surface located along the longitudinal axis at least in part between a center of the hub and a first carrier element of the hub, and at least one second groove of the at least one radially encircling second grooves is formed in a second region of the hub inner surface located along the longitudinal axis at least in part between the center of the hub and an end of the hub opposite the first carrier element.

2. The pump arrangement as claimed in claim 1, wherein at least one of the at least one radially encircling first grooves and the at least one radially encircling second grooves includes a plurality of grooves, and
the tolerance rings are arranged in more than one of the plurality of grooves.

3. The pump arrangement as claimed in claim 1, wherein the pump arrangement is a block design in which the pump casing is coupled to the drive motor.

4. The pump arrangement as claimed in claim 1, wherein an outer shell surface of the hub is smooth.

5. The pump arrangement as claimed in claim 1, wherein the outer rotor includes a threaded bore in a region of the first carrier element.

6. The pump arrangement as claimed in claim 5, wherein the threaded bore has a larger diameter than a threaded bore of the drive shaft.

7. The pump arrangement as claimed in claim 1, wherein the tolerance rings are configured such that when in an installed position the tolerance rings do not extend circumferentially into the feather key groove.

* * * * *